UNITED STATES PATENT OFFICE.

AUGUSTE CHAVASSE, OF MONTREAL, CANADA, ASSIGNOR OF ONE-HALF HIS RIGHT TO ARSÉNE RAMBOUILLET, OF SAME PLACE.

IMPROVEMENT IN ANTI-INCRUSTATION COMPOUNDS.

Specification forming part of Letters Patent No. 171,599, dated December 28, 1875; application filed November 19, 1875.

*To all whom it may concern:*

Be it known that I, AUGUSTE CHAVASSE, of the city of Montreal, in the county of Hochelaga, in the Province of Quebec, in the Dominion of Canada, engineer, have invented certain new and useful Improvements in Compositions for Removing Boiler-Scale; and I hereby declare the following to be a full, clear, and exact description, and will enable any one to compound the same.

The object of my improved composition is to soften the scale or incrustation of boilers, so that it may be easily removed. As is well known, acids are commonly used, which often injure the boiler, and, as a proof that my composition has no acid in it, it may be taken internally without even causing sickness.

To remove the scale from a boiler of eighty-horse power the ingredients forming the composition would be mixed and prepared in the following manner and proportions: To twenty pounds of molasses of sugar add fifteen pounds of extract of cedar bark and one gallon of water. Then boil them for about half an hour, after which allow the liquid to settle for twenty-four hours, when add the whites of six eggs. The liquid is then well stirred, and may be immediately applied to the scale of the boiler. After the application has been made the boiler may be used for twelve or fifteen days, when the scale will be found reduced to a paste, and may be easily removed.

Having thus described my invention, what I claim as new, and desire to secure by Letters Patent, is—

A composition for removing boiler-scale composed of molasses of sugar, extract of cedar bark, and the whites of eggs, prepared and mixed in the proportions and for the purpose specified.

In testimony that I claim the foregoing I have hereunto set my hand and seal this 1st day of November, 1875.

AUGUSTE CHAVASSE. [L. S.]

In the presence of—
HENRY FRANCIS QUELCH,
ARTHUR HITCHINGS CHAMBERS.